United States Patent [19]

Pashan et al.

[11] Patent Number: 5,233,606
[45] Date of Patent: Aug. 3, 1993

[54] ARRANGEMENT FOR CONTROLLING SHARED-BUFFER-MEMORY OVERFLOW IN A MULTI-PRIORITY ENVIRONMENT

[75] Inventors: Mark A. Pashan; Ronald A. Spanke, both of Wheaton, Ill.

[73] Assignee: AT&T Bell Laboratories, Murray Hill, N.J.

[21] Appl. No.: 739,931

[22] Filed: Aug. 2, 1991

[51] Int. Cl.⁵ ................................................. H04J 3/24
[52] U.S. Cl. ..................................... 370/85.6; 370/60; 370/94.1; 340/825.5; 395/425
[58] Field of Search ................. 370/60, 61, 85.2, 85.6, 370/94.1; 340/825.5, 825.51, 825.52; 395/425

[56] References Cited

U.S. PATENT DOCUMENTS

| | | | |
|---|---|---|---|
| 4,093,823 | 6/1978 | Chu | 370/92 |
| 4,314,367 | 2/1982 | Bakka et al. | 370/60 |
| 4,499,576 | 2/1985 | Fraser | 370/94.1 |
| 4,531,204 | 7/1985 | Vanderschel | 367/25 |
| 4,603,416 | 7/1986 | Servel et al. | 370/94.1 |
| 4,757,529 | 7/1988 | Glapa et al. | 370/60 |
| 4,849,968 | 7/1989 | Turner | 370/94.1 |
| 4,953,157 | 8/1990 | Franklin et al. | 370/60 |
| 5,016,248 | 5/1991 | Kudoh | 370/94.1 |
| 5,048,013 | 9/1991 | Eng et al. | 370/79 |
| 5,062,106 | 10/1991 | Yamazaki et al. | 370/85.6 |
| 5,083,269 | 1/1992 | Syobatake et al. | 395/425 |

FOREIGN PATENT DOCUMENTS 9104624 4/1991 World Int. Prop. O. .

OTHER PUBLICATIONS

H. Kuwahara et al., "A Shared Buffer Memory Switch for an ATM Exchange", *IEEE Int'l Conf. on Comms.*, vol 1, (Jun. 11-14, 1989), pp. 4.4.1-4.4.5.

H. Suzuki, "Output-buffer Switch Architecture for Asynchronous Transfer Mode", *IEEE Int'l Conf. on Comms.*, vol. 1 (Jun. 11-14, 1989), pp. 4.1.1-4.1.5.

J. Fried, "A VLSI Chip Set for Burst and Fast ATM Switching", *IEEE Int'l. Conf. on Comms.*, vol. 1 (Jun. 11-14, 1989), pp. 4.6.1-4.6.8.

*Primary Examiner*—Douglas W. Olms
*Assistant Examiner*—Alpus H. Hsu
*Attorney, Agent, or Firm*—David Volejnicek

[57] ABSTRACT

A shared-buffer-memory-based ATM switching module (FIG. 1) used with ATM cells having a multiplicity of priorities has a plurality of queues (100) for each output port (O-N), one for each cell priority, and handles buffer overflow in a manner fair to all output ports. It initially allows output-port queues (100) to completely consume the buffer memory (12). Thereafter, when an additional incoming cell is received for which there is no room in the buffer memory, the lengths of all of the queues of each output port are individually summed (402) and compared to determine which port has the greatest number of buffered cells (406). A buffered ATM cell is discarded (410) from the lowest-priority non-empty queue of that port (408). The incoming cell is then stored in the memory space vacated by the discarded cell (412).

9 Claims, 2 Drawing Sheets

ARRANGEMENT FOR CONTROLLING SHARED-BUFFER-MEMORY OVERFLOW IN A MULTI-PRIORITY ENVIRONMENT

TECHNICAL FIELD

The invention relates generally to packet-switching systems and relates specifically to shared-buffer-memory-based ATM switching systems.

BACKGROUND OF THE INVENTION

The Asynchronous Transfer Mode (ATM) packet-switching technique is becoming the standard for switched broadband ISDN (BISDN) applications. Of the various ATM switch architectures that have been proposed, the shared-buffer-memory-based architecture appears most promising. In this architecture, incoming ATM cells (the packets) destined for different output ports are buffered on queues that correspond to those ports and that share a common memory. The cells are later retrieved from the queues for transmission on their destination ports, a cell at each port at a time.

To implement the queues, it is not practical to use a buffer memory of unlimited size, and hence the possibility of memory overflow must be taken into consideration in the design of the ATM switch. A most efficient approach to handling overflow is disclosed in published international patent application WO 91/04624. This approach initially allows the output port queues to completely consume the buffer memory. Thereafter, when an additional incoming ATM cell is received for which there is no room in the buffer memory, the lengths of the output port queues are compared to determine which is the longest. An ATM cell is discarded from the head of the longest queue, and the vacated memory space is allocated to the just-incoming ATM cell.

The ATM standard allows for different ATM cells to have different priorities. The abovementioned international patent application does not take multiple priorities into consideration. However, others do. For example, H. Kuwahara et al., "A Shared Buffer Memory Switch for an ATM Exchange", *IEEE International Conference on Communications*, Vol.1 Jun. 11-14, 1989), pp. 4.41-4.4.5, teach that, in a multiple-priority environment, each output port of the ATM switch has associated therewith not one, but a plurality of queues, each for buffering ATM cells of a different priority that are destined for that output port. They propose to deal with the possibility of buffer-memory overflow by allowing each queue to reach only a predetermined maximum size and thereafter discarding any additional incoming ATM cells destined for storage on any queues that have reached that maximum size. Unfortunately, this approach may result in ATM cells being discarded even while empty storage space exists in the buffer memory. It therefore lacks the efficiency of the approach described in the abovementioned international application.

SUMMARY OF THE INVENTION

This invention is directed to solving these and other disadvantages of the prior art. As in the prior art, a shared-buffer-memory-based switch in a multiple-priority environment has a plurality of queues for each output port, a different queue for cells of each priority. According to the invention, the queues are initially allowed to completely consume the buffer memory, but thereafter, when an additional incoming cell is received for which there is no room in the buffer memory, the lengths of all of the queues of each output port are individually summed and compared to determine which port has the greatest total number of buffered cells, and an ATM cell is discarded from the lowest-priority non-empty queue of that port. The incoming cell is then stored in the memory space vacated by the discarded cell.

This approach to handling buffer-memory overflow in a multiple-priority environment brings the efficiency advantages of the approach disclosed in the abovementioned international application to the multiple-priority environment. Yet, at the same time, it does not either favor or penalize any port on account of the priority of the cells that are queued up for that port. Rather, it introduces fairness among the ports, by ensuring that the port which is most responsible for the occurrence of the overflow is the one penalized by having one of its cells deleted, irrespective of that cell's priority.

These and other advantages and features of the invention will become apparent from the following description of an illustrative embodiment of the invention considered together with the drawing.

DETAILED DESCRIPTION

Figure 1:
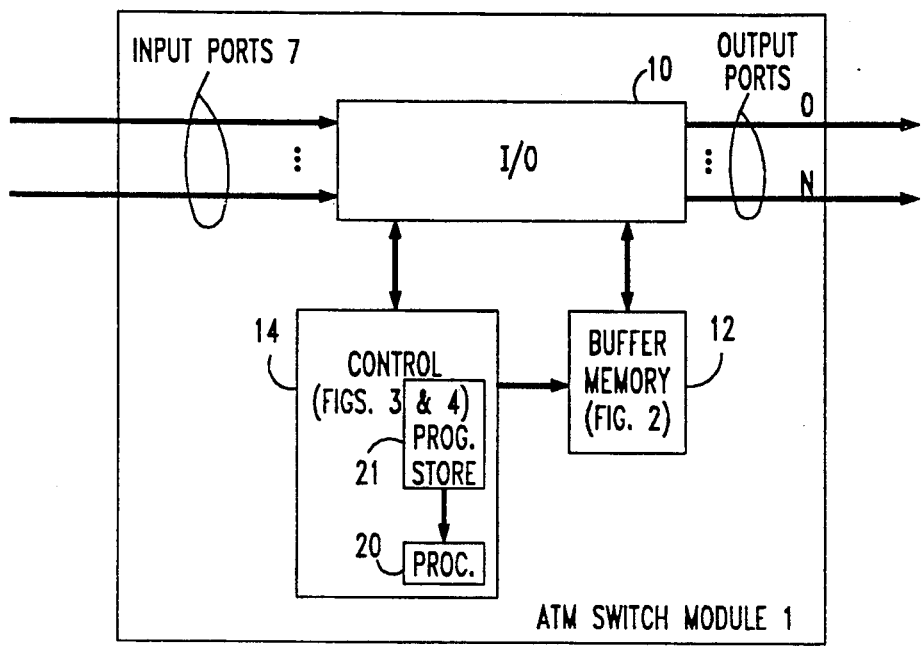
FIG. 1 shows an ATM switch module embodying an illustrative example of the invention.

FIG. 1 shows a shared-buffer-memory-based ATM switch module 1. Such switches are well known in the art. An illustrative example thereof is disclosed in WO 91/04624, which is hereby incorporated herein by reference. Module 1 comprises one or more input ports 7 over which module 1 receives incoming ATM cells. Individual ATM cells can be of any one of a plurality (O-M) of priorities. Input ports 7 are connected to input and output circuitry (I/O) 10 which couples input ports 7 to a control 14, a buffer memory 12, and to output ports O-N. I/O 10 illustratively comprises phase-alignment circuitry, serial-to-parallel and parallel-to-serial shift registers, and multiplexers and demultiplexers. Copies of header portions of incoming ATM cells received from input ports 7 are sent by I/O 10 to control 14, and the cells are sent by I/O 10 to buffer memory 12 for storage.

Figure 2:
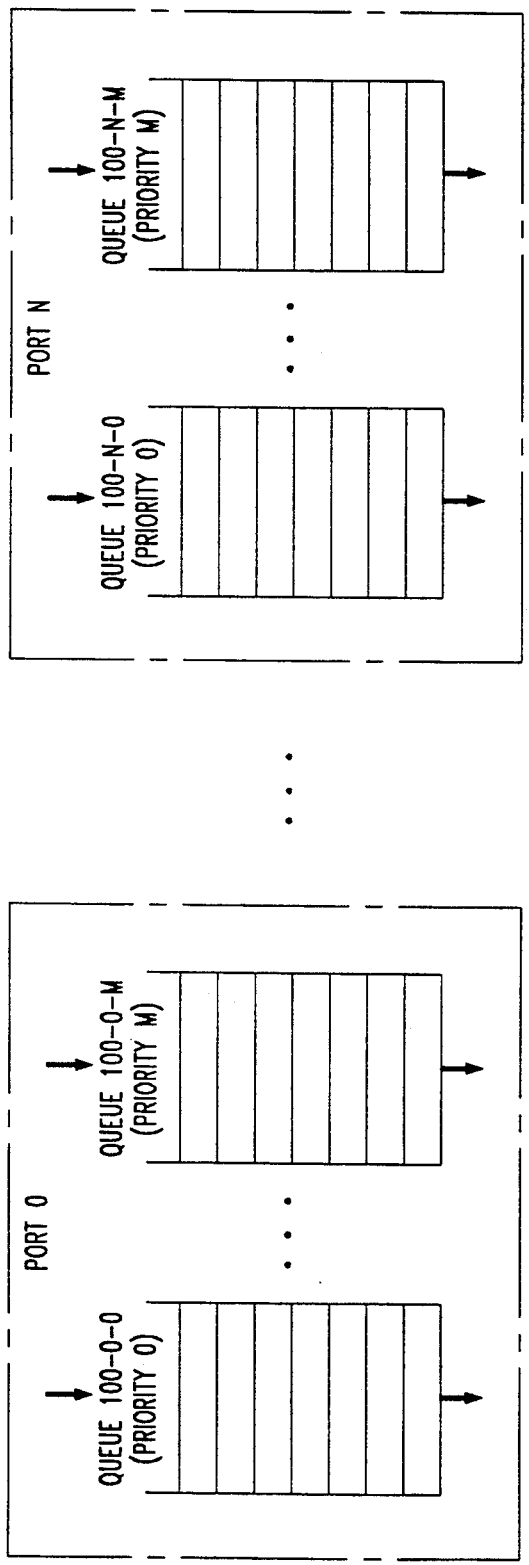
FIG. 2 shows contents of the buffer memory of the ATM switch module of FIG. 1.

Buffer memory 12 is shown in FIG. 2. It comprises one or more RAMs that implement a plurality of queues 100 for each output port O-N. For every individual one of the output ports O-N, buffer memory 12 provides a separate queue 100 for each one of the ATM cell priorities O-M. While FIG. 2 suggests that queues 100 are implemented as physical queues, alternatively they may be implemented as logical queues in the form of linked lists or some other data structures. To distinguish between the various queues 100, numerical designations 100-$i$-$j$ are used in FIG. 2, where $i$ identifies the one of the output ports O-N with which the queue is associated, and $j$ identifies the ATM cell priority to which the queue corresponds.

Figure 3:
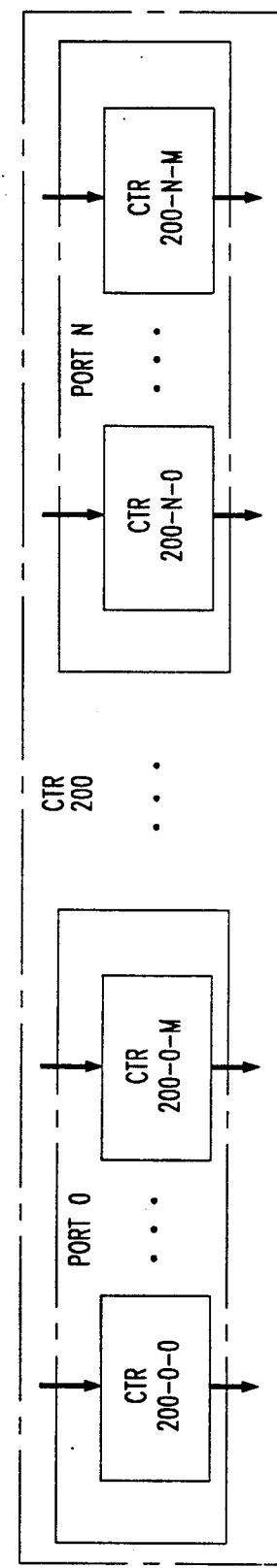
FIG. 3 shows queue length counters of the control of the ATM switch module of FIG. 1.

Returning to FIG. 1, control 14 controls storage of incoming ATM cells in buffer memory 12 and transmission of stored ATM cells at output ports O-N. Control 14 illustratively comprises a queue processor (PROC.) 20, a pointer RAM, an output-port counter, and queue-length counters 200 shown in FIG. 3. Counters 200 include one counter 200 for each queue 100. To distinguish between the various counters 200, numerical designations 200-$i$-$j$ are used in FIG. 3, where i and j have the same meaning as in FIG. 2.

Based on the header of an incoming ATM cell, received from I/O 10, control 14 determines the priority and the destination output port of that cell, and then causes the cell to be stored in the corresponding queue 100 in buffer memory 12 and increments that queue's corresponding counter 200. Control 14 also periodically accesses the highest-priority non-empty queue 100 of the one of the output ports O-N that is identified by the present count of the output-port counter, retrieves therefrom an ATM cell that is at the head of the queue, decrements that queue's corresponding counter 200, and causes I/O 10 to transmit the retrieved cell on the corresponding one of the output ports O-N.

Figure 4:
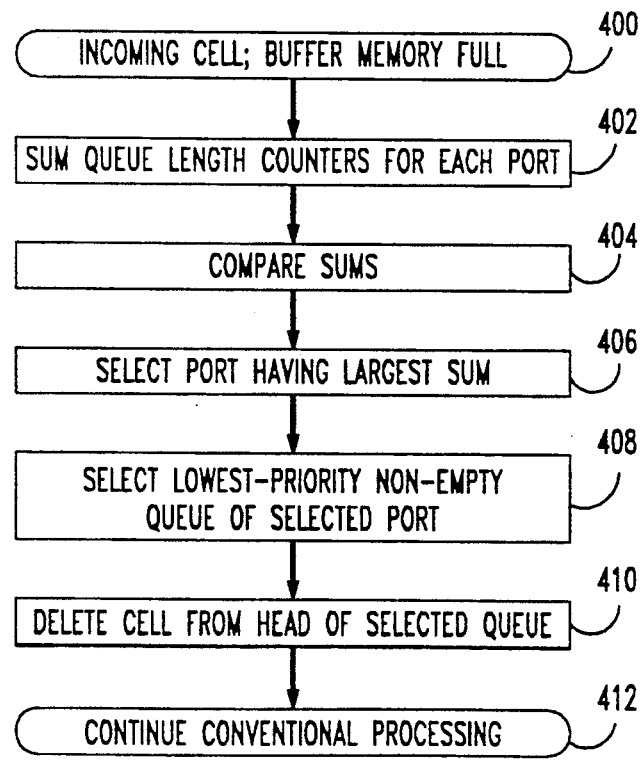
FIG. 4 shows a buffer memory overflow procedure of the control of the ATM switch module of FIG. 1.

Control 14 allows queues 100 to fully occupy buffer memory 12, in the conventional manner. If an incoming ATM cell is received while buffer memory 12 is fully occupied, buffer-memory overflow occurs. Control 14 deals with the overflow by executing the procedure of FIG. 4. This procedure is illustratively implemented either in hardware or in software stored in a program store (PROG. STORE) 21.

Upon detecting the overflow, at step 400, control 14 sums the counts of queue length counters 200 individually for each one of the output ports O-N, at step 402. This gives control 14 a count of the number of ATM cells that are queued up for each one of the output ports O-N. Control 14 then compares the sums, at step 404, to determine which one of the output ports O-N has the most ATM cells queued up, and selects that port, at step 406. Control 14 uses queue-length counters 200 of queues 100 of the selected port to select the lowest-priority non-empty queue 100 of the selected port, at step 408. Control 14 then deletes an ATM cell from the head of the selected queue 100, at step 410. The deletion frees space in buffer memory 12 for the incoming ATM cell whose receipt resulted in the overflow condition. Controller 14 then continues with conventional processing, at step 412, which includes storing the incoming ATM cell in the storage space vacated by the deleted cell and appending that storage space to the tail of the queue 100 to which the incoming ATM cell corresponds.

Of course, it should be understood that various changes and modification to the illustrative embodiment described above will be apparent to those skilled in the art. For example, the invention need not be used in conjunction with ATM cells, but may be used in conjunction with any buffered communications, including other packet types. Also, instead of using separate counters for each queue, a single counter may be used for each output port which keeps a count of the total number (i.e., the sum) of cells queued up for the corresponding port in all of that port's queues. A flag per queue in a bit field may then be used to indicate the empty-not empty status of individual queues. Such changes and modifications can be made without departing from the spirit and the scope of the invention and without diminishing its attendant advantages. It is therefore intended that all such changes and modifications be covered by the following claims.

We claim:

1. A shared-buffer-memory-based packet-switching arrangement comprising:
   a plurality of output ports;
   a buffer memory defining a plurality of queues for each output port, each queue of an individual output port for storing packets destined for the individual output port and having a priority different from priorities of packets stored by other queues of the individual output port;
   means responsive to receipt of a packet having a priority and destined for an individual output port, for storing the received packet in the queue for storing packets of that priority for the individual output port;
   means for transmitting packets stored in the queues on corresponding output ports; and
   means responsive to receipt of a packet while storage space of the buffer memory is fully consumed by the queues, for deleting a stored packet from a non-empty queue storing lowest-priority packets stored for an output port that has the most packets stored in its queues, to vacate buffer-memory storage space for storing the received packet.

2. The arrangement of claim 1 wherein the deleting means comprise:
   means for identifying an output port that has the most packets stored in its queues; and
   means for identifying a non-empty queue storing lowest-priority packets stored for the identified output port.

3. The arrangement of claim 1 wherein the deleting means comprise:
   a plurality of counters, a different one corresponding to each queue, for generating a count indicating a number of packets stored on the corresponding queue;
   means for summing the counts of the counters corresponding to all queues of individual output ports;
   means for comparing the sums to identify the output port having the most stored packets; and
   means for examining the counts of the counters corresponding to the queues of the identified output port to identify a non-empty queue storing the lowest-priority packets stored for the identified output port.

4. A control arrangement for a shared-buffer-memory-based packet-switching module having a plurality of output ports and a buffer memory defining a plurality of queues for each output port, each queue of an individual output port for storing packets destined for the individual output port and having a priority different from priorities of packets stored by other queues of the individual output port, the arrangement comprising:
   means responsive to receipt of a packet having a priority and destined for an individual output port, for storing the received packet in the queue for storing packets of that priority for the individual output port;
   means for transmitting packets stored in the queues on corresponding output ports; and
   means responsive to receipt of a packet while storage space of the buffer memory is fully consumed by the queues, for deleting a stored packet from a non-empty queue storing lowest-priority packets stored for an output port that has the most packets stored in its queues, to vacate buffer-memory storage space for storing the received packet.

5. The arrangement of claim 4 wherein the deleting means comprise:
   means for identifying an output port that has the most packets stored in its queues; and
   means for identifying a non-empty queue storing lowest-priority packets stored for the identified output port.

6. The arrangement of claim 4 wherein the deleting means comprise:
   a plurality of counters, a different one corresponding to each queue, for generating a count indicating a number of packets stored on the corresponding queue;
   means for summing the counts of the counters corresponding to all queues of individual output ports;
   means for comparing the sums to identify the output port having the most stored packets; and
   means for examining the counts of the counters corresponding to the queues of the identified output port to identify a non-empty queue storing the lowest-priority packets stored for the identified output port.

7. A method of controlling overflow of a shared-buffer-memory-based packet-switching module having a plurality of output ports and a buffer memory defining a plurality of queues for each output port, each queue of an individual output port for storing packets destined for the individual output port and having a priority different from priorities of packets stored by other queues of the individual output port, the method comprising the steps of:
   in response to receipt of a packet having a priority and destined for an individual output port while storage space of the buffer memory is fully consumed by the queues, deleting a stored packet from a non-empty queue storing lowest-priority packets stored for an output port that has the most packets stored in its queues; and
   in response to the deletion, storing the received packet in the queue for storing packets of that priority for the individual output port, in buffer-memory storage space vacated by the deleted packet.

8. The method of claim 7 wherein the step of deleting comprises the steps of:
   identifying an output port that has the most packets stored in its queues; and
   identifying a non-empty queue storing lowest-priority packets stored for the identified output port.

9. The method of claim 7 for a switching module further having a plurality of counters, a different one corresponding to each queue, for generating a count indicating a number of packets stored on the corresponding queue, wherein the step of deleting comprises the steps of:
   summing the counts of the counters corresponding to all queues of individual output ports;
   comparing the sums to identify the output port having the most stored packets; and
   examining the counts of the counters corresponding to the queues of the identified output port to identify a non-empty queue storing the lowest-priority packets stored for the identified output port.

* * * * *